US008893216B2

(12) United States Patent
Yadav et al.

(10) Patent No.: US 8,893,216 B2
(45) Date of Patent: Nov. 18, 2014

(54) SECURITY MEASURES FOR THE SMART GRID

(75) Inventors: Navindra Yadav, Cupertino, CA (US); Jeffrey D. Taft, Washington, PA (US)

(73) Assignee: Cisco Technology, Inc., San Jose, CA (US)

( * ) Notice: Subject to any disclaimer, the term of this patent is extended or adjusted under 35 U.S.C. 154(b) by 284 days.

(21) Appl. No.: 13/160,909

(22) Filed: Jun. 15, 2011

(65) Prior Publication Data

US 2012/0323381 A1    Dec. 20, 2012

(51) Int. Cl.
H04L 29/06    (2006.01)

(52) U.S. Cl.
CPC ............. H04L 63/0236 (2013.01); Y04S 40/24 (2013.01); H04L 63/1441 (2013.01); H04L 63/1491 (2013.01)
USPC .................... 726/1; 726/13; 726/22; 700/286

(58) Field of Classification Search
None
See application file for complete search history.

(56) References Cited

U.S. PATENT DOCUMENTS

| | | | |
|---|---|---|---|
| 7,761,910 B2* | 7/2010 | Ransom et al. ................... 726/6 |
| 2004/0117624 A1* | 6/2004 | Brandt et al. ................. 713/166 |
| 2004/0153171 A1* | 8/2004 | Brandt et al. ..................... 700/9 |
| 2008/0016104 A1* | 1/2008 | Kuehr-McLaren et al. .. 707/102 |
| 2008/0162930 A1* | 7/2008 | Finney et al. ................. 713/165 |
| 2009/0049515 A1* | 2/2009 | Hsu .................................. 726/1 |
| 2010/0146584 A1* | 6/2010 | Haswarey et al. ................ 726/1 |
| 2011/0307936 A1 | 12/2011 | Braendle et al. |
| 2012/0203874 A1* | 8/2012 | Pamulaparthy ............... 709/220 |

FOREIGN PATENT DOCUMENTS

| | | |
|---|---|---|
| DE | 10 2008 059 487 A1 | 6/2010 |
| EP | 2 200 249 A1 | 6/2010 |
| WO | 2010/034335 A1 | 4/2010 |

OTHER PUBLICATIONS

Translation of DE 102008059487, published Jun. 24, 2010, machine translated on Jul. 3, 2014 by Google Patents.*
Hadeli, et al., "Leveraging Determinism in Industrial Control Systems for Advanced Anomaly Detection and Reliable Security Configuration," Emerging Technologies & Factory Automation, 2009, ETFA 2009, IEEE Conference, Sep. 22, 2009, pp. 1-8.
Notification of Transmittal of the International Search Report and the Written Opinion of the International Searching Authority from International Application No. PCT/US2012/042692, dated Jan. 3, 2013, 17 pages.

* cited by examiner

*Primary Examiner* — Jung Kim
*Assistant Examiner* — Robert Leung
(74) *Attorney, Agent, or Firm* — Parker Ibrahim & Berg LLC; James M. Behmke, Esq.; Stephen D. LeBarron, Esq.

(57) ABSTRACT

Security is enabled in an electrical system by examining a configuration file for a substation present in the electrical system, where the substation includes one or more electrical devices and one or more network devices. Based on the examination of the configuration file, information is determined on a characteristic of an electrical device that is selected from a group including a type, allowed role of the electrical device and allowed communication modes for the electrical device. Based on the determined information, a basis for controlling the role and communication modes for the electrical device is identified. A security policy is configured in a network device in the substation to incorporate the identified basis. Based on the configured security policy in the network device, communication patterns for the electrical device are allowed that are associated with the allowed role and allowed communication modes for the electrical device.

29 Claims, 4 Drawing Sheets

FIG. 1

```xml
<Communication>
    <SubNetwork name="W01" type="8-MMS">
        <Text>Station bus</Text>
        <BitRate unit="b/s">10</BitRate>
        <ConnectedAP iedName="D1Q1SB4" apName="S1">
            <Address>
                <P type="IP">10.0.0.11</P>
                <P type="IP-SUBNET">255.255.255.0</P>
                <P type="IP-GATEWAY">10.0.0.101</P>
                <P type="OSI-TSEL">00000001</P>
                <P type="OSI-PSEL">01</P>
                <P type="OSI-SSEL">01</P>
            </Address>
            <PhysConn type="Plug">
                <P type="type">FOC</P>
                <P type="Plug">ST</P>
            </PhysConn>
            <SMV ldinst="C1" cbName="Volt">
                <Address>
                    <P type="MAC-Address">01-0C-CD-04-00-01</P>
                    <P type="APPID">4000</P>
                    <P type="VLAN-ID">123</P>
                    <P type="VLAN-PRIORITY">4</P>
                </Address>
            </SMV>
        </ConnectedAP>
        <ConnectedAP iedName="E1Q1SB1" apName="S1">
            <Address>
                <P type="IP">10.0.0.1</P>
                <P type="IP-SUBNET">255.255.255.0</P>
                <P type="IP-GATEWAY">10.0.0.101</P>
                <P type="OSI-TSEL">00000001</P>
                <P type="OSI-PSEL">01</P>
                <P type="OSI-SSEL">01</P>
            </Address>
            <GSE ldinst="C1" cbName="Goose1">
                <Address>
                    <P type="MAC-Address">01-0C-CD-01-00-01</P>
                    <P type="APPID">3000</P>
                    <P type="VLAN-PRIORITY">4</P>
                </Address>
            </GSE>
        </ConnectedAP>
    </SubNetwork>
</Communication>
```

SECURITY MEASURES FOR THE SMART GRID

TECHNICAL FIELD

The following disclosure relates generally to security measures for the smart grid.

BACKGROUND

Electrical devices in a smart grid are sometimes subject to security attacks by malicious adversaries. For example, substations in the smart grid are connected to external public and non-public networks that facilitate easy access by non-authorized users to the devices in the substations.

BRIEF DESCRIPTION OF THE FIGURES

FIG. 2 illustrates an example of substation configuration file.

DESCRIPTION OF EXAMPLE EMBODIMENTS

Overview

In one implementation, security is enabled in an electrical system by examining a configuration file for a substation present in the electrical system, where the substation includes one or more electrical devices and one or more network devices. Based on the examination of the configuration file, information is determined on a characteristic of an electrical device, the characteristic being selected from a group including a type of the electrical device, an allowed role of the electrical device in the substation and allowed communication modes for the electrical device. Based on the determined information, a basis for controlling the characteristic of the electrical device is identified. A security policy is configured in a network device in the substation to incorporate the identified basis. Based on the configured security policy in the network device, communication patterns for the electrical device are allowed that are associated with characteristic of the electrical device.

In another implementation, security is enabled in an electrical system by examining at a first time, a configuration file for a substation of the electrical system that includes at least one electrical device and at least one network device, wherein the examination of the configuration file is conducted while the at least one electrical device is performing operations in the electrical system. Based on the examination of the configuration file, at least one characteristic of a first electrical device in the substation is determined, the at least one characteristic being selected from a group including a type of the first electrical device, an allowed role of the first electrical device in the substation and allowed communication modes for the first electrical device. Based on determining the at least one characteristic of the first electrical device, a basis for controlling the at least one characteristic of the first electrical device is identified.

The configuration file is examined at a second time that is different from the first time, based on a modification to the configuration file while the at least one electrical device is performing operations in the electrical system. Based on examining the configuration file at the second time, one or more modifications to the at least one characteristic of the first electrical device are determined. The basis for controlling the at least one characteristic of the first electrical device is updated based on the determination of the one or more modifications to the at least one characteristic of the first electrical device.

DETAILED DESCRIPTION OF EXAMPLE EMBODIMENTS

The communications and control mechanisms for utility systems generally include interconnected networking systems and applications employing commercial off the shelf (COTS) technology (i.e., operating systems and protocols). Such utility systems are typically integrated closely with utility control centers, and less closely, with utility data centers through various public and non-public communications networks. Examples of utility systems employing such interconnected communication and control mechanisms include, but are not limited to including, electrical utility systems and water supply utility systems.

One or more electrical utility systems that are interconnected through public and non-public communications networks form a smart electrical power grid (also referred to as a "smart grid"). While the interconnected nature of the communications and control systems for a smart grid provides several benefits, such as increased visibility of grid state and remote monitoring of the protection and control systems and utility assets that reduces support costs and allows problems to be solved more quickly, the connectivity through external communications networks (e.g., public communications networks) may allow unauthorized users to access the control systems of the smart grid and thus manipulate the operations of the smart grid.

At a component level, some of the key operations of a smart grid are performed by one or more interconnected substations. In this context, a substation represents an electrical utility subsystem in a geographical location. The substation has multiple electrical devices included therein, which are connected to one another and also to electrical devices in remote substations through the system control and communications system of the utility. In an alternative implementation, a substation represents a logical collection of one or more electrical devices that have certain characteristics and/or that perform some common operations.

Standards and protocols are used for the communications and control systems for the substations in the smart grid that define standards for models, terms, and information exchanges that allow the control systems to share information in a consistent way. In addition, a substation includes one or more intelligent devices, such as an Intelligent Electronic Device (IED) that is an intelligent programmable device with enhanced processing capabilities that may be running an open-source operating system (e.g., Linux) and also may include digital signal processors. The ability to exchange information in a standard format and to run standard open operating systems increases the vulnerability of a substation to misuse and attack by individuals with malicious intent and therefore introduces potential risks to the smart grid. The complexity of the configuration and system operations of the substation in terms of physical hardware, programming, and communications, makes it difficult to determine who is authorized to access electronic information; what data or functions a user should be able to access; where the access request originates; when a user can have access to the information; and how the access is requested, among various other security issues. Thus, the smart grid is susceptible to cyber-warfare attacks from one or more adversaries. A cyber-attack that successfully compromises a smart grid may result in massive power outages.

A secure architecture for the smart grid prevents cyber-attacks by enhancing the security of the communications and control system networks that govern the operations of the smart grid. Vulnerabilities in the substation devices of the smart grid are identified and enabling security mechanisms are built into the substations to neutralize the security threats posed by the identified vulnerabilities. Security mechanisms improve the capabilities of the substations for resilience to security attacks and/or recovery from security attacks that can compromise the operation of the smart grid.

In one implementation, security mechanisms are implemented that are based on the detection of anomalous behavior of the electrical devices along with containment, for example, behavioral security methods. Behavioral security methods leverage domain knowledge of the smart grid to create and enforce security rules using existing switches and routers that connect electrical devices within substations, and also interconnect substations in the smart grid. Behavioral security methods perform automatic classification of grid devices and establishment of legitimate relationships between devices. Based on the classification and relationships, the behavioral security methods automatically configure and implement enforcement rules in the network, and also provide statistics on the traffic in the grid that comply with the enforcement rules and statistics on the traffic that do not comply, or are in conflict with, the enforcement rules.

Figure 1:
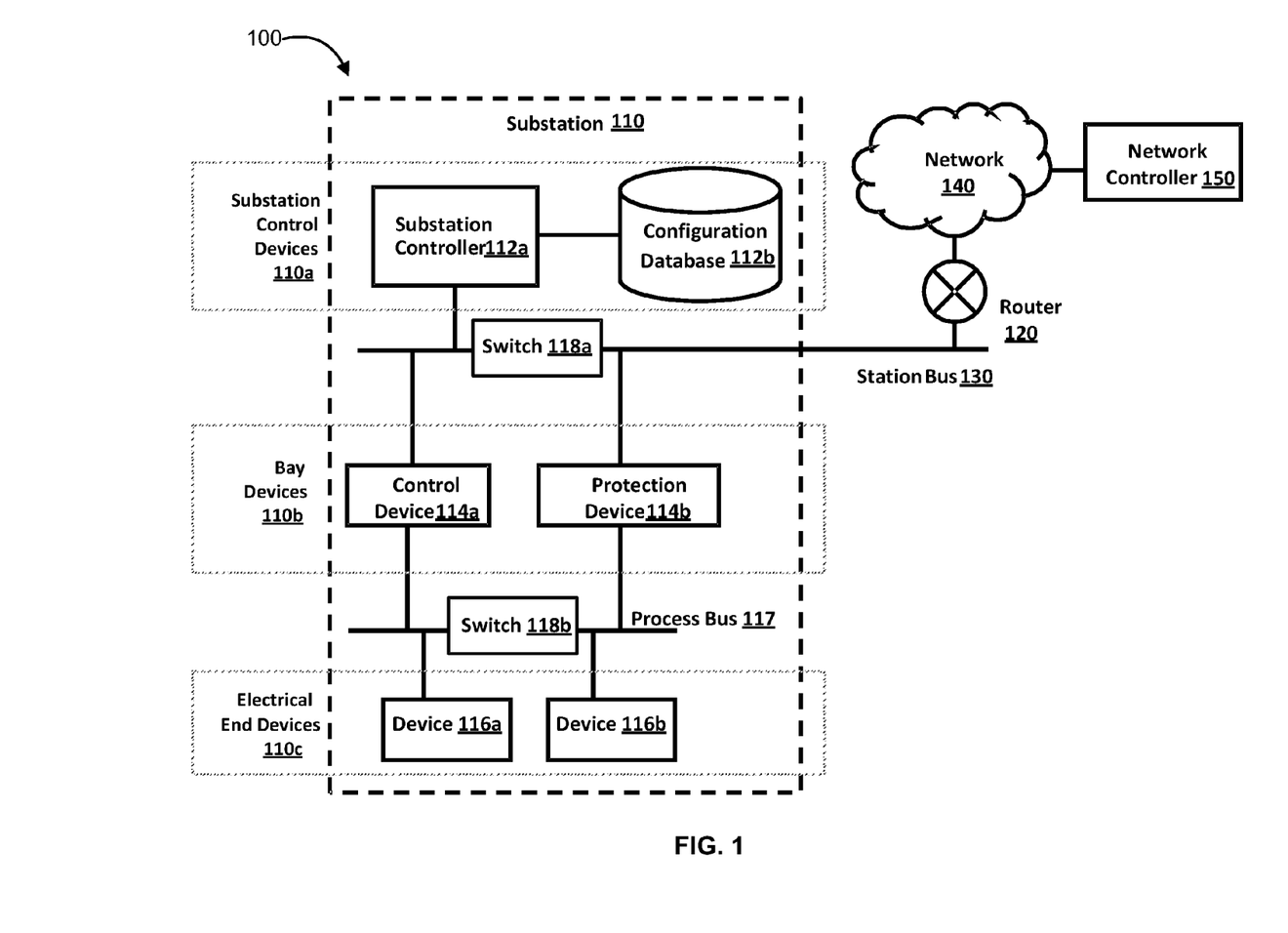
FIG. 1 illustrates an example of an electrical system that includes one or more electrical devices.

FIG. 1 illustrates an example of an electrical system 100 that includes one or more electrical devices. The electrical system 100 includes a portion of the smart grid. The electrical system 100 includes a substation 110 that is connected to a router 120 through a station bus 130. The router 120 connects the substation 110 to a network 140, which interconnects the substation 110 to a network controller 150. The substation 110 includes one or more substation control devices 110a, such as the substation controller 112a and the configuration database 112b. The substation 110 also includes one or more bay devices 110b, such as the control device 114a and the protection device 114b, and one or more electrical end devices, such as device 116a and device 116b. The devices in the substation 110 are interconnected by the station bus 130 and the process bus 117 through one or more switches 118a and 118b.

Substation 110 represents a physical unit in a geographical location that includes one or more electrical devices. For example, substation 110 represents a physical building including multiple pieces of large equipment that are connected to the smart grid to process electricity for distribution. In an alternative implementation, substation 110 represents a logical unit that has one or more interconnected electrical devices performing a common role or operation.

The characteristics of the substation 110 are represented by one or more configuration files, e.g., the substation configuration files. A substation configuration file may include, but is not limited to including, information about the role of devices in the substation, the other devices in the substation that a device can exchange messages with, types of messages that can be exchanged, the physical interface address (e.g., the Medium Access Control (MAC) address) and the network address (e.g., the Internet Protocol (IP) address) of each electrical end device in the substation and the virtual LANs (VLANs) connecting the devices in the substation. The devices in the substation 110 perform well-defined functions that are specified in the substation configuration files.

The substation 110 conforms to certain standards for its configuration and operation. In one example, the substation 110 conforms to the International Electrotechnical Commission (IEC) 61850 standard, which specifies the configurations of the networks and devices in an electrical substation. Based on conformance with the IEC 61850 standard, the substation configuration files for the substation 110 are written in the Substation Configuration Language (SCL). An example of a substation configuration file written in the SCL syntax is described in the following discussion from the FIG. 2 code with a rectangle at item 200.

The substation controller 112a is used for local configuration, control and monitoring of the functions within the substation 110. The substation controller 112a includes a computer with a display and a keyboard and mouse combination for input/output interaction of a human user, e.g., the substation operator. The substation controller 112a accesses the information stored in the configuration database 112b for configuring the substation 110 and/or for monitoring the substation 110. In an alternative implementation, the substation controller 112a includes local configuration computer and a monitoring computer that is distinct from the configuration computer.

The substation controller 112a reads the substation configuration files by accessing the configuration database 112b, and based on the information in the configuration files, the substation controller 112a will send instructions to configure the bay devices 110b and the electrical devices 110c. If the substation 110 implements behavioral security methods, then the substation controller 112a also configures enforcement rules on the network devices connected to the substation 110, e.g., the switches 118a and 118b and the router 120. In one implementation, the functionality of the switches 118a and 118b, or the router 120, are incorporated in one or more substation devices, e.g., substation relays. Substation relays include, for example, protective relay devices that are designed to calculate operating conditions on one or more electrical circuits in the substation 110 and trip circuit breakers when a fault is detected.

For monitoring, the substation controller collects device status reports like fault information, trip status, voltage and current measurements from the bay devices 110b and the electrical devices 110c. If the substation 110 implements behavioral security methods, then the substation controller 112a also collect security statistics from the network devices in the substation, e.g., statistics on allowed traffic for the electrical devices and/or blocked traffic for the electrical devices.

The configuration database 112b includes a component of the substation controller 112, e.g., a large-capacity hard drive contained in the substation controller 112, or the configuration database 112b can include a physically distinct database unit. The configuration database 112b stores the substation configuration files. The configuration database 112b also stores device status reports collected from the substation devices and security statistics collected from the network devices. In one implementation, the configuration database 112b also is used for archiving long-term historical data that are normally used globally for the complete substation on a station-level in the smart grid. The substation control devices 110a, which include the substation controller 112a and the configuration database 112b, are allowed to communicate with all devices in the substation and also with devices outside the substation, for example with remote components of the smart grid like the network controller 150.

The bay devices 110b include one or more control devices 114a and one or more protection devices 114b. The bay devices are used for collecting measurements from the electrical devices and performing computations on the collected measurements for operational purposes and/or statistical analysis. The bay devices also are used as protection devices, for example to protect the various devices in the substation from negative effects due to the malfunctioning of an electrical device supported by the substation (e.g., 116a or 116b).

The bay devices 114a and/or 114b include a polyphase electric meter (MMTR) and a polyphase measurement unit (MMXU). The MMTR acquires values from electrical end devices such as current transformers and voltage transformers, and calculates the energy (e.g., by integrating the values) used out of the acquired voltage and current samples. The MMXU acquires values from current transformers and voltage transformers and computes values like root mean square for current and voltage or power flows out of the acquired voltage and current samples from the different transformers. The computed values are used for operational purposes such as power flow supervision.

The bay devices 114a and 114b include intelligent electrical devices (IEDs). IEDs receive data from sensors and power equipment and can issue control commands, such as tripping circuit breakers if they sense voltage, current or frequency anomalies, or raise/lower voltage levels in order to maintain the desired voltage level. IEDs include miniaturized computers with advanced microcontrollers and embedded digital signal processor (DSP) chips without keyboard and mouse, and running specialized software configured to perform specific tasks. Examples of IEDs include, but are not limited to including, protective relaying devices, load tap changer controllers, circuit breaker controllers, capacitor bank switches, recloser controllers, voltage regulators, and additional devices not mentioned here.

In normal operation of the substation 110, the bay devices 114a and/or 114b communicate with other bay devices. The bay devices 114a and/or 114b also communicate with remote devices in the smart grid that are external to the substation 110 (e.g., for management).

The electrical devices 110c include one or more of devices 116a and 116b. The electrical devices 116a and 116b is used for the generation and transmission of electricity in the smart grid. The electrical devices 116a and 116b include current transformers (TCTR), voltage transformers (TVTR), circuit breakers (XCBR) and isolator switches (XSWI). In normal operation of the substation 110, the electrical devices 116a and 116b communicate primarily with their respective bay devices, for example 114a and 114b. In certain situations, the electrical devices 116a or 116b communicate with other electrical devices within the substation 110. The electrical devices 116a and 116b do not communicate with devices that are external to the substation 110. However, in an alternative implementation, the electrical devices 116a and 116b may have limited communication with electrical devices belonging to a remote substation.

The electrical devices 110c communicate with one another and with the bay devices 110b over the process bus 117. The process bus 117 includes physical cables that interconnect the different devices. The bay devices 110b communicate with the substation control devices 110a and also to remote devices external to the substation 110 via the station bus 130. The station bus 130 includes physical cables that interconnect the different devices. The station bus 130 and the process bus 117 include one or more switches, for example switches 118a and 118b. The switches 118a and 118b are networking devices that are used to switch traffic from one communications link to another so as to interconnect the devices in the substation 110. In addition or as an alternative to being used for interconnecting devices, the switches 118a and 118b are used as switches that protect the various substation control devices 110a, bay devices 110b and/or electrical devices 110c from damage that is caused by surge current due to the malfunctioning of one or more devices in the substation. If behavioral security methods are implemented in the substation 110, then the switches 118a and 118b also is used for enforcing security rules that only permit allowed communications traffic to flow between devices in the substation 110.

The router 120 is used to route data traffic between devices in the substation 110 and the external network 140. The router 120 includes a standard networking router that is capable of inspecting and transmitting IP packets. In addition, if behavioral security methods are implemented for the substation 110, then the router 120 also is used for enforcing security rules that only permit allowed communications traffic to flow between devices in the substation 110 and the network 140.

The network 140 generally includes public and non-public networks that interconnect the substation 110 to other substations for transmission of data traffic. In one implementation, the network 140 includes the Internet. In a different implementation, the network 140 includes other public and non-public networks that are different from the Internet. The network 140 connects the substation 110 to the network controller 150. The network 140 also enables access to the substation 110 by users outside the smart grid, e.g., unauthorized users who connect to the network 140 through various public and non-public networks.

The controller 150 includes a remote centralized monitoring station that can monitor the traffic statistics of substation 110. The controller 150 includes a computer with a display and a keyboard and mouse combination for input/output interaction of a human user, and a connection to the network 140 for communicating with the substation 110. In one implementation, the controller 150 also is capable of performing remote configuration of the substation 110. Therefore, the controller 150 is able to access the configuration database 112b. The controller 150 is connected to the substation 110 using a public network 140, in which case the suitable security mechanisms is implemented for authentication, authorization and access control before allowing the controller 150 to access the information contained in the substation 110. In an alternative implementation, the controller 150 is connected to the substation 110 using a secure private network 140 that is dedicated to the traffic for the smart grid.

FIG. 2 illustrates an example of substation configuration file 200. The substation configuration file 200 includes a section of a substation configuration description (SCD) file that specifies the configuration of the substation 110. The SCD file includes one of several configuration files present in the substation 110. Other configuration files present in the substation 110 may include, but are not limited to including, the configured IED description (CID) files that describe the configuration of the IEDs in the substation 110.

The substation configuration file 200 is written in SCL, which is described in sections 6 and 7 of the IEC 61850 standard. As will be appreciated by those skilled in the art, the IEC 61850 SCD specifies a configuration for the primary power system structure in a substation, which includes information on the primary apparatus functions that are used, and how the systems are connected; the communications system in a substation, which specifies how IEDs are connected to subnetworks and networks, and at which of their communication access points (communication ports); and the application level communications, which includes specifications on how data is grouped into data sets for sending, how IEDs trigger the sending and which service they choose, which input data from other IEDs is needed. The IEC 61850 SCD also specifies, for each IED in a substation, the logical devices configured on the IED, the logical nodes with class and type belonging to each logical device, the reports and their data contents, the (pre-configured) associations available; and which data shall be logged. Further, the IEC 61850 SCD provides instantiable logical node (LN) type definitions that include the relations between instantiated logical nodes and their hosting IEDs on one side and the switchyard (function) parts on the other side.

SCL is an adaptation of the eXtensible Markup Language (XML) that is adapted for describing the devices in an electrical substation. Therefore the substation configuration file may be examined by using software that implements an XML engine.

The substation configuration file 200 includes information about the roles of each device in the substation 110, other devices that each device in the substation 110 can exchange messages with, the type of messages that can be exchanged, the physical interface address (e.g., the Medium Access Control (MAC) address) and the network address (e.g., the Internet Protocol (IP) address) of each electrical end device in the substation and the virtual LANs (VLANs) connecting the devices in the substation.

Figure 3:
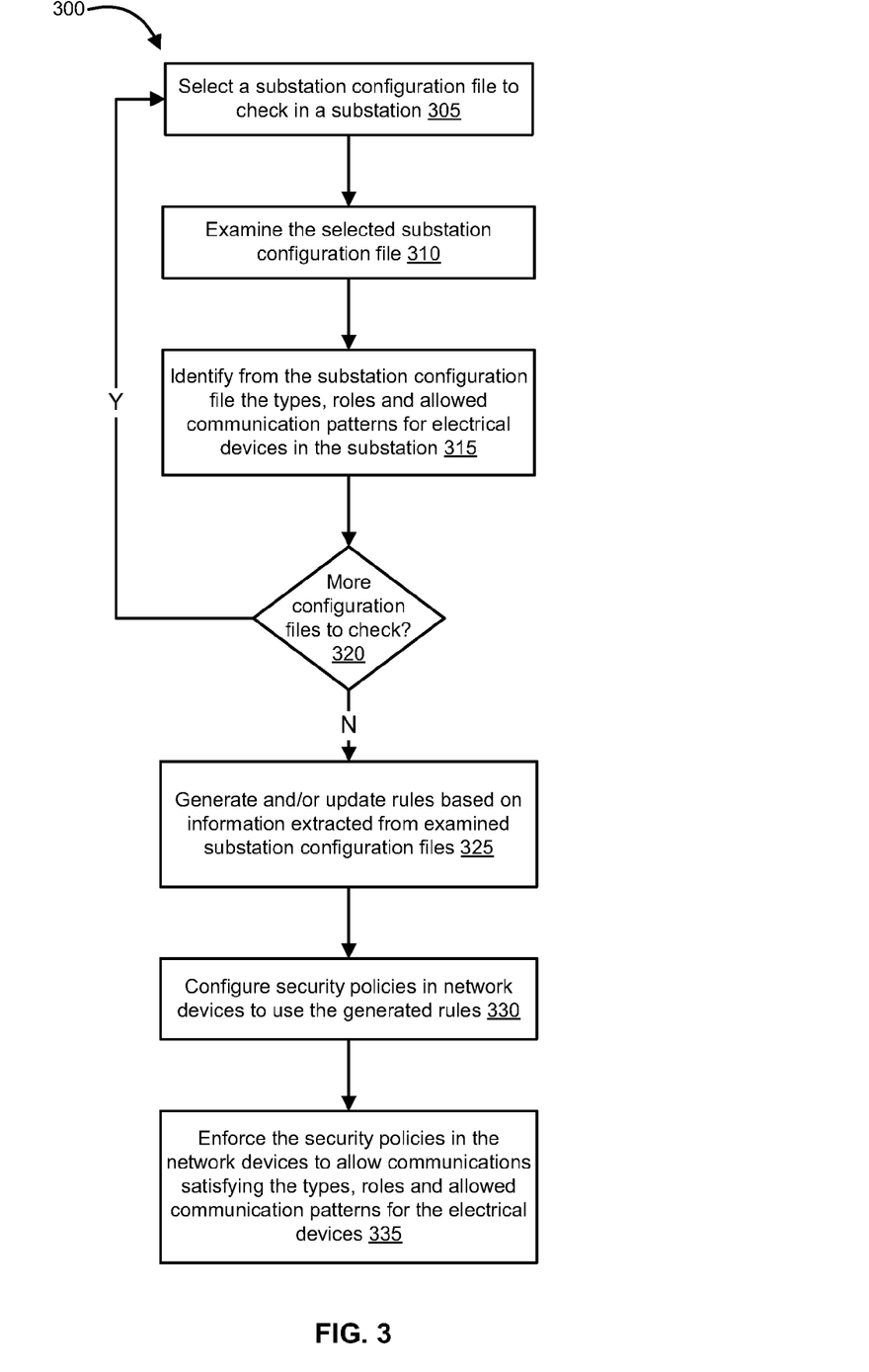
FIG. 3 is a flow chart illustrating an example of a process for implementing behavioral security in a smart grid.

FIG. 3 is a flow chart illustrating an example of a process 300 for implementing behavioral security in a smart grid. The following describes process 300 as being performed by components of electrical system 100 that is described with reference to FIG. 1. However, the process 300 also may be performed by other communications systems or system configurations.

The process 300 is used for examining the substation configuration files in the substation 110 and for configuring security rules for the substation 110 based on the configuration information extracted from the substation configuration files. In one implementation, the process 300 is run for every substation in the smart grid from a centralized location, e.g., the network controller 150. In an alternative implementation, the process 300 is run in a distributed manner separately in each substation in the smart grid. The process 300 is implemented in the substation controller 112a in the substation 110.

The substation controller 112a running the process 300 selects a substation configuration file to check in the substation 110 (305). The substation configuration file includes the substation configuration file 200, which is an SCD file that describes the configuration of the substation. The substation configuration file is present in the configuration database 114. The substation configuration file also includes an ICD file that describes the configuration of an IED in the substation 110, e.g., control device 114a or protection device 114b.

The process 300 running in the substation controller 112a parses the selected substation configuration file (310) to extract information on the various devices present in the substation 110. The process 300 is running an XML software engine that is used to parse the substation configuration file 200 which is written in SCL, as illustrated by FIG. 2. In one implementation, the process 300 selects a substation configuration file that was previously examined in a past run of the process 300. An examination of a substation configuration file includes interpreting the contents of the substation configuration file. In another implementation, an examination of a substation configuration file includes compiling the contents of the substation configuration file. In yet another implementation, an examination of a substation configuration file includes both interpreting and compiling the contents of the substation configuration file.

The substation configuration file is selected based on updates to the substation configuration file, which triggers a signal to the process 300 to re-parse the substation configuration file to extract the updated information. This is done in real-time when the various devices in the substation 110 are operational. The updates to the substation configuration file have been generated by the station operator accessing the substation configuration file using the controller 112a. In an alternative implementation, the updates to the substation configuration file have been generated by the remote user who accesses the substation configuration file using the network controller 150.

Based on the information extracted from the selected substation configuration file, the process 300 identifies the types, roles and allowed communications patterns for the electrical devices in the substation (315). An electrical device has the capability of performing more than one role. However, the roles that are allowed for the electrical device in the current configuration of the substation are specified by the substation configuration file. For example, the devices in the substation 110 play well-defined roles. Device 116a includes a current transformer (TCTR): that plays a specific role that is used to measure the current flow on a circuit and generates specific measurement messages. Device 116b includes an insulation medium supervision (SIMS) device that supervises the insulation medium, for example the gas volumes of gas insulated switchgear (GIS) regarding density, pressure and temperature. Based on the well-defined roles, the devices in the substation 110 have very specific communication signatures that allow easy correlation of the communications in the substation with the devices.

The relationships between the devices in a substation are well established by the information contained in the substation configuration files. This determines the communication patterns that are allowed for the devices. For example, a coarse relationship that is determined is that electrical end device 116a or 116b in the substation 110 communicates with devices on the process bus 117 and not directly with devices that are external to the substation 110 in remote locations on the network 140. A fine-grained relationship that is determined from the substation configuration file is a voltage transformer (TVTR) and current transformer (TCTR) (e.g., devices 116a and 116b) talk to a protection device and a metering/measurement device (MMTR/MMXU) from amongst the bay devices 110b. For example, two electrical end devices like a current transformer (TCTR) and a circuit breaker (XCBR) (e.g., 116a and 116b) do not directly talk. However, the XCBR communicates with a control switch (CSWI) (e.g., control device 114a) that commands the XCBR.

In an alternative implementation, a network device uses a dynamic method to learn the device types and allowed communication patterns. The network device inspects the traffic passing between the electrical devices and then automatically learns the devices and their types, based on deep packet inspection technologies. There is a training period during which the network device performs device profiling in order to classify them.

After the selected substation configuration file is examined and the information is extracted from the substation configuration file, the process 300 checks to see whether there are more configuration files to check (320). For example, there is new ICD files or updates to existing ICD files for the IED devices in the substation 110 that are to be examined. If the process 300 identifies additional configuration files that are to be examined, then the process 300 selects one of the identified additional configuration files, parses the file and extracts information concerning device type, roles and allowed communication patterns (305-315). The action is repeated until there are no additional configuration files that are to be examined.

Returning to step 320, once the process 300 determines that all configuration files have been checked, the process 300 generates rules based on the information extracted from the configuration files that have been examined (325). The process 300 also updates existing rules based on the information extracted from the configuration files that have been examined. For example, an enforcement rule is generated for electrical device 116a that specifies that the only communication that is allowed to be generated by device 116a are measurement data for control device 114a, while the communication that is allowed to be sent to the electrical device 116a are control commands from device 114a. The rules are generated based on the information extracted on the device roles and coarse or fine-grained relationships between the devices. The process 300 also generates assurance reporting rules, which are implemented on security-enabled devices in the substation 110 and provide instructions to generate reports for the controller 112a (or the controller 150) periodically or on event triggers. The reports provide information on the compliance of the traffic in the substation 110 with the security rules that are being enforced in the substation 110. The enforcement rules and the assurance reporting rules are generated for each device in the substation 110. In addition or as an alternative to the above, the enforcement rules and the assurance reporting rules also is generated for the substation 110 as a unit. For example, an enforcement rule is generated and implemented in the router 120 that specifies the traffic that is allowed to be sent to or from the substation 110.

The process 300 configures one or more network devices to implement security policies that use the rules that are generated (330). For example, the process 300 implements the rules on the router 120 and/or the switches 118a and 118b. Based on the information extracted from the substation configuration files, the process 300 determines the network topology in the substation 110 and the mapping of which electrical devices are connected to which access switch or router. The network topology and mapping information facilitates the implementation of the security rules pervasively, e.g., down to the granularity of access ports on the switches 118a or 118b. For example, the switches 118a or 118b support various types of access control lists (ACLs), including MAC ACLs, IP version 4 (IPv4) ACLs and IP version 6 (IPv6) ACLs that can be attached to a port, VLAN or routing interface. After parsing the substation configuration files for the substation 110, the process 300 generates explicit permit ACLs for all the traffic that are allowed on the process bus 117 or the station bus 130, and a catch-all deny rule is placed in the end of the ACLs to filter all unwanted/illegal traffic on the process bus 117 or the station bus 130. The process 300 then configure access control lists on the switches 118a and 118b, such that there is a permit access control entry for every allowed message exchange between the electrical end devices 116a and 116b. The permit access control entry is followed by a deny access control entry that drops all other traffic. The ACLs is applied on every applicable port on the switches 118a and 118b that process traffic between the electrical end devices 116a and 116b.

Based on the configured security policies and rules, the process 300 enforces the security policies implemented in the network devices that allow only communications satisfying the types, roles and allowed communication patterns for the electrical devices in the substation (335), as determined from the substation configuration files. All other communications is dropped and/or logged for monitoring. For example, a network device utilizes existing packet (and/or frame) sniffing technologies to inspect the headers of packets (and/or frames) that arrive at a security-enabled incoming port on the network device. The inspection determines the source and destination devices for the traffic. The network device looks up the ACLs that are implemented on the specific port to determine whether the traffic is allowed between the determined <source, destination> pair. If the traffic matches the patterns in the permit ACLs, then the network device forwards the packet (and/or frame) on the associated outgoing port. However, if the traffic does not match the patterns in the permit ACLs, then the network device drops the packet (and/or frame) and logs the event in memory. The log specifies the <source, destination> pair, the time of packet arrival and the size of the packet. Based on the configuration of assurance reporting rules, the network device report the logs to the controller nodes at periodic intervals, or the network device report the event immediately upon logging.

Thus security can be enforced for the substation. The security policies configured on the network devices allow the network to detect when unrelated devices communicate, e.g., an insulation monitor (SIMS) does not communicate with a circuit breaker (XCBR). The network also detects when an illegal command is sent from one device to another, even when they have a relationship, e.g., a voltage transformer sends a current measurement to a polyphase measuring unit. The network also provide an assurance, e.g., a network device can readout device configuration and validate consistency with larger configuration, and/or cross check the configuration finger printing result for an electrical device with the substation configuration for accuracy. For example the router 120 detect and block an attempted communication from electrical end device 116a or 116b to a remote destination external to the substation 110, since the rules implemented on the router specify that electrical end devices not communicate with devices external to the substation 110. The router 120 report the event to the substation controller 112a, which then analyzes the event to determine who initiated the transaction. Based on the analysis, the substation controller 112a determine that the electrical end device 116a has been infected by malicious software, and therefore the infected electrical end device 116a is quarantined, with no communication allowed to or from the device 116a. Subsequently the station operator runs security software on the electrical end device 116a that neutralizes and removes the malicious software. Once the electrical end device 116a has been determined to be clean of malicious software, it is brought back online into the substation 110 and permitted traffic to and from the electrical end device 116a again be allowed.

Thus using the process 300 the substation 110 develops a database of legitimate transaction rules. The security policies configured on the network devices direct the network devices to vet the communications exchanges in the substation 110 against the rules database. The communications exchanges that violate the rules in the database indicate that the source of the communications is suspicious and therefore the source is quarantined for inspection.

In one implementation, there are different levels of actions to be performed based on the severity of the security violation. For example, an attempted communication exchange in which a current transformer attempts to send a current measurement to a circuit breaker in the substation is flagged as invalid by a switch on the communications forwarding path between the current transformer and the circuit breaker, based on the rules in the database. Further, the security policies configured in the switch classify the communications attempt as a minor security breach and therefore cause the switch to log the event in a security log for analysis at a later point in time. On the other hand, a command from an unrecognized source external to the substation that attempts to modify the output of the current transformer is flagged as a breach by an ingress router for the substation. The security policies configured in the router classify the attempted command as a major security breach and therefore cause the router to send an immediate alarm to the substation controller, in addition to logging the event. Thus, the security policies that may be configured in the network devices in the substation are configured for different levels of alarm escalation based on the perceived severity of the security threat.

Figure 4:
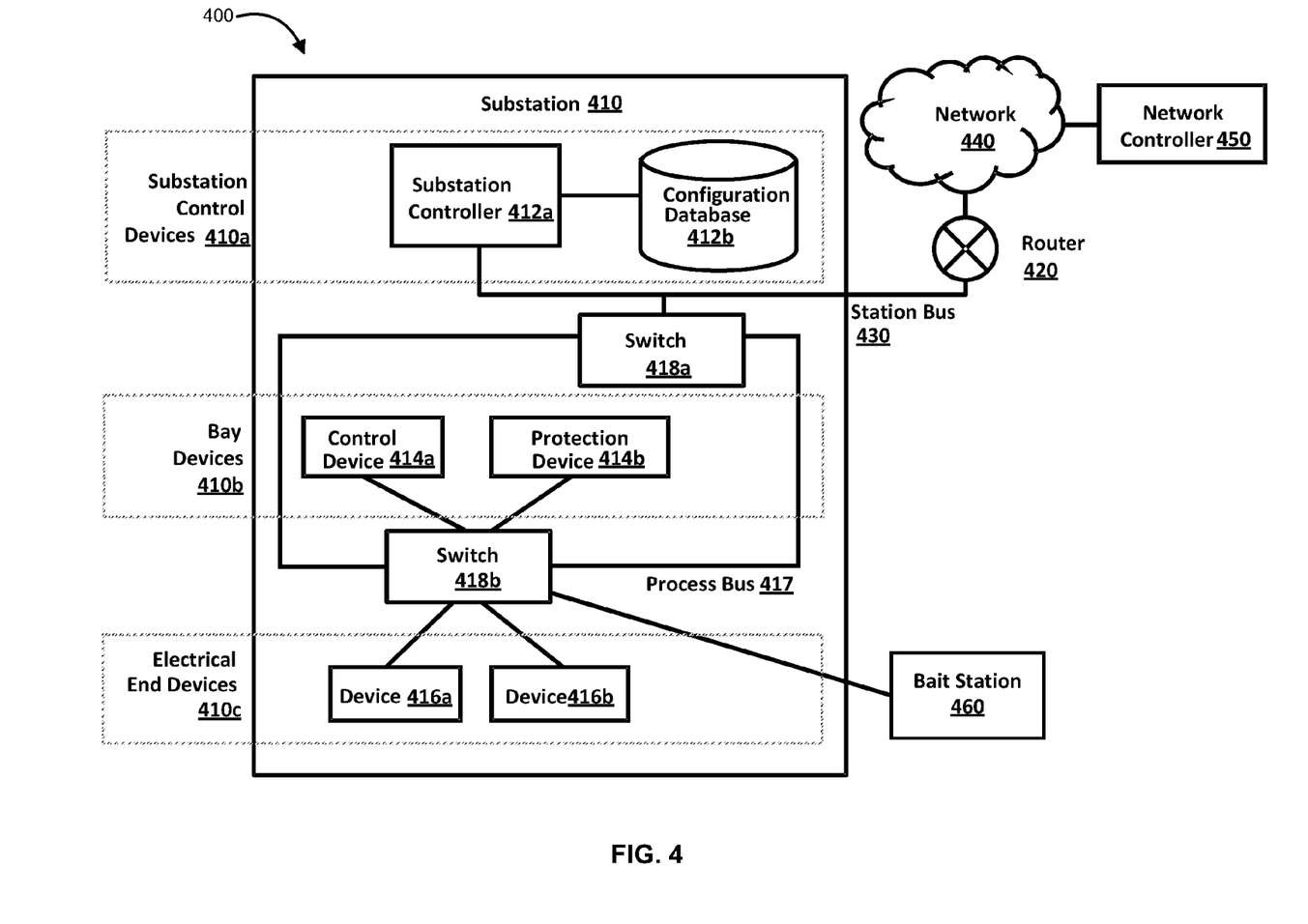
FIG. 4 illustrates an example of an electrical system that includes one or more bait stations for detecting silent malware.

The security policies are also used for detecting silent malware (also referred to as sleeper malware), which includes malicious software that exist on security-compromised electrical devices but not have been activate to launch an attack. Such malware and the associated security-compromised electrical devices are identified prior to the attack being launched, by installing bait station 460 in the substation, as shown in FIG. 4. A bait station 460 helps infiltrate the malware network and provide valuable intelligence (e.g., signatures of the malware communications patterns).

FIG. 4 illustrates an example of an electrical system 400 that includes one or more bait stations 460 for detecting silent malware. The electrical system 400 is a section of the smart grid. The electrical system 400 is similar to the electrical system 100 and it includes devices that are similar to the devices in the electrical system 100, performing similar roles. For example, the electrical system 400 includes a substation 410 that is connected to a router 420 through a station bus 430. The router 420 connects the substation 410 to a network 440. The network 440 interconnects the substation 410 to a network controller 450. The substation 410 includes one or more substation control devices 410a, for example the substation controller 412a and the configuration database 412b. The substation 410 also includes one or more bay devices 410b, for example the control device 414a and the protection device 414b. In addition, the substation 410 includes one or more electrical end devices, for example device 416a and device 416b. The devices in the substation 410 are interconnected by the station bus 430 and the process bus 417 through one or more switches 418a and 418b. In addition, the system 400 has one or more bait stations 460 (also referred to as "honey pots") that can be connected to both the process bus 417 and the station bus 430. For example, bait station 460 is connected to the devices in the substation 410 through the switch 418b, the process bus 417 and the station bus 430.

The bait station 460 may be a computer that substantially has no active role in the substation 410, other than to get attacked by the malware that is present in one or more electrical devices in the substation 410. The bait station 460 may have multiple tracing, troubleshooting and logging tools installed in it, in order to help in capturing the attack, exploit, command and control methods of the malware that is present in one or more electrical devices in the substation 410.

The security policies that are operational in the system 400 watch the bait station 460 closely. For example, the switch 418b monitors who contacts the bait station 460. Devices within the substation 410 that contact the bait station 460 are considered to have been compromised with sleeper malware. If a remote device outside the substation 410 tries to contact the bait station 460, the router 420 marks the external IP address of the contacting device as one belonging to an attacker. The router 420 also observes which other devices in the substation 410 are contacted by the device associated with the external IP address, and the identified devices in the substation 410 are inspected for compromise. The network devices log the transactions for further inspection.

The network devices also monitor who the bait station 460 attempt to contact. If the bait station 460 contacts an IP address that is external to the substation 410, then that IP address belong to the malware's command and control center. The router 420 records the IP address and monitor if any of the other devices in the substation 410 make any contact with the recorded external IP address. If any other device in the substation 410 attempts to send traffic to the recorded external IP address, they are equally compromised with the sleeper malware. Moreover, if the bait station 460 tries to contact any other device in the substation 410, it is interpreted by the security policies as a method used by the malware to spread. The switches drop the packets associated with the traffic from the bait station 460, in order to prevent the spread of the malware infection. Thus using bait stations the system 400 is able to detect both active and silent (sleeper) malware, and is able to provide immediate containment of the malware.

Therefore the behavioral security methods, for example implemented by the process 300 running on either the system 100 or the system 400, provide resilience to attacks on the electrical devices in the smart grid. The behavioral security methods get information quickly without any reconfiguration of computers or need to redirect logging mechanisms. They do not affect network or data sources and do not add overhead to the end systems. They monitor and detect in real time networks attacks or misuse.

In one implementation, in order to minimize the latency associated with having the switches 418a or 418b monitor the traffic for security compliance, one or more malware detector nodes with security rules and policies installed within is connected to the switches 418a or 418b. A malware detector node can help the switches 418a and/or 418b identify and quarantine infected devices in the substation 410. For example, the switch 418b copies all traffic to the malware detector node that is connected to the switch 418b. The malware detector node detects attacks and tells switch 418b what security enforcement policies to implement to drop and/or log the non-compliant traffic.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. The apparatus also may include transitory and non-transitory media. For example, the transitory media may include electromagnetic and optical waves, while non-transitory media may include computer hard drives, optical disks and portable flash drives.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for enabling security in an electrical system, the method comprising:
   examining, by a controller device in an electrical substation, a configuration file for the electrical substation, wherein the electrical substation includes an electrical device and a network device in an electrical system, wherein the electrical device is associated with generation and transmission of electricity, and the network device is connected to the electrical device and associated with managing data communications exchanged by the electrical device with other devices in the electrical system;
   based on examining the configuration file, obtaining determining, by the controller device, a new role of the electrical device in the electrical substation;
   in response to obtaining the new role of the electrical device in the electrical substation, determining, by the controller device, communication patterns that are allowed for the new role of the electrical device;
   generating, by the controller device, a rule that specifies the communication patterns that are allowed for the new role of the electrical device; and
   configuring, by the controller device, a security policy in the network device in the electrical substation to incorporate the generated rule, such that data communications exchanged by the electrical device with other devices in the electrical system are managed at the network device based on the generated rule incorporated into the security policy configured in the network device.

2. The method of claim 1, wherein examining the configuration file for the electrical substation comprises:
   determining, by the controller device, that an update to an existing configuration file for the electrical substation has been generated; and
   examining the configuration file for the electrical substation in response to determining that the update to the existing configuration file for the electrical substation has been generated.

3. The method of claim 1, comprising:
   accessing, based on examining the configuration file, topology information associated with the electrical substation that includes a location of the network device relative to the electrical device;
   determining, based on the topology information, that the network device is associated with managing data communication exchanged by the electrical device with other devices in the electrical system; and
   configuring the security policy in the network device based on determining that the network device is associated with managing data communication exchanged by the electrical device with other devices in the electrical system.

4. The method of claim 1, comprising:
   configuring the security policy to allow communication patterns associated with the electrical device by specifying an identity of remote devices with which the electrical device exchanges messages, and an indication of a type of messages that is exchanged.

5. The method of claim 1, wherein examining the configuration file includes examining a syntax that is presented in a Substation Configuration Language (SCL).

6. The method of claim 1, wherein the new role of the electrical device is selected from the group consisting of a current transformer, a voltage transformer, a circuit breaker, an isolator and an insulation monitor.

7. The method of claim 2, wherein the electrical device is operable to perform one of a plurality of roles in the electrical substation, the method comprising:
based on examining the configuration file for the electrical substation in response to determining that the update to the existing configuration file for the electrical substation has been generated, determining that an existing role of the electrical device has been updated to the new role,
wherein communication patterns associated with the new role of the electrical device are different from communication patterns associated with the existing role of the electrical device.

8. The method of claim 1, wherein determining the new role of the electrical device comprises inspecting messages associated with operation of the electrical system that are exchanged by the electrical device with other devices in the electrical system.

9. The method of claim 1, comprising configuring the electrical device with a first role and a second role, wherein the first role corresponds to a first mode of operation of the electrical device in the electrical substation and a first communication pattern, while the second role corresponds to a second mode of operation of the electrical device in the electrical substation and a second communication pattern.

10. The method of claim 1, wherein configuring the security policy in the network device to incorporate the generated rule comprises adding a permit information entry to a rules database in the network device for all allowed communication patterns for the electrical device.

11. The method of claim 10, wherein the rules database includes an access control list (ACL) and wherein adding the permit information entry to the rules database comprises adding a permit ACL entry that is operable to allow message exchanges between the electrical device and other devices that satisfy the allowed communication patterns associated with the electrical device.

12. The method of claim 11, comprising adding a deny ACL entry that is operable to drop message exchanges for the electrical device that are not associated with the allowed communication patterns for the electrical device.

13. The method of claim 10, comprising associating a rules database with each of one or more ports on the network device.

14. The method of claim 13, wherein the network device includes a first port that has an associated ACL, the method comprising:
inspecting a packet corresponding to a message exchange by the electrical device that is received at the first port; and
determining, using the ACL associated with the first port, whether to allow or drop the packet.

15. The method of claim 14, comprising:
based upon a determination that the information associated with the packet does not correspond to a permit information entry in the ACL, dropping the packet at the first port; and
recording in the network device, information indicating the packet is dropped at the first port.

16. The method of claim 14, comprising:
based upon a determination that information associated with the packet corresponds to a permit information entry in the ACL, allowing passage of the packet through the first port.

17. The method of claim 1, wherein the network device is one of a switch, a router, or a substation relay.

18. A system for enabling security in an electrical system, the system comprising:
a processor coupled to a memory;
one or more instructions encoded in non-transitory computer-readable storage medium for execution by the processor, and, when executed by the processor, operable to cause the processor to perform operations comprising:
examining, by a controller device in an electrical substation, a configuration file for the electrical substation, wherein the electrical substation includes an electrical device and a network device in an electrical system, wherein the electrical device is associated with generation and transmission of electricity, and the network device is connected to the electrical device and associated with managing data communications exchanged by the electrical device with other devices in the electrical system;
based on examining the configuration file, obtaining determining, by the controller device, a new role of the electrical device in the electrical substation;
in response to obtaining the new role of the electrical device in the electrical substation, determining, by the controller device, communication patterns that are allowed for the new role of the electrical device;
generating, by the controller device, a rule that specifies the communication patterns that are allowed for the new role of the electrical device; and
configuring, by the controller device, a security policy in the network device in the electrical substation to incorporate the generated rule, such that data communications exchanged by the electrical device with other devices in the electrical system are managed at the network device based on the generated rule incorporated into the security policy configured in the network device.

19. The system of claim 18, wherein examining the configuration file for the electrical substation comprises:
determining, by the controller device, that an update to an existing configuration file for the electrical substation has been generated; and
examining the configuration file for the electrical substation in response to determining that the update to the existing configuration file for the electrical substation has been generated.

20. A non-transitory computer-readable storage medium including one or more instructions for execution by a processor, the one or more instructions when executed by the processor operable to cause the processor to perform operations including:
examining, by a controller device in an electrical substation, a configuration file for the electrical substation, wherein the electrical substation includes an electrical device and a network device in an electrical system, wherein the electrical device is associated with generation and transmission of electricity, and the network device is connected to the electrical device and associated with managing data communications exchanged by the electrical device with other devices in the electrical system;
based on examining the configuration file, obtaining determining, by the controller device, a new role of the electrical device in the electrical substation;
in response to obtaining the new role of the electrical device in the electrical substation, determining, by the controller device, communication patterns that are allowed for the new role of the electrical device;

generating, by the controller device, a rule that specifies the communication patterns that are allowed for the new role of the electrical device; and configuring, by the controller device, a security policy in the network device in the electrical substation to incorporate the generated rule, such that data communications exchanged by the electrical device with other devices in the electrical system are managed at the network device based on the generated rule incorporated into the security policy configured in the network device.

21. The non-transitory computer-readable storage medium of claim 20, wherein examining the configuration file for the electrical substation comprises:

determining, by the controller device, that an update to an existing configuration file for the electrical substation has been generated; and examining the configuration file for the electrical substation in response to determining that the update to the existing configuration file for the electrical substation has been generated.

22. The system of claim 18, wherein the new role of the electrical device is selected from the group consisting of a current transformer, a voltage transformer, a circuit breaker, an isolator and an insulation monitor.

23. The system of claim 19, wherein the electrical device is operable to perform one of a plurality of roles in the electrical substation, and wherein the one or more instructions are operable to cause the processor to perform operations comprising:

based on examining the configuration file for the electrical substation in response to determining that the update to the existing configuration file for the electrical substation has been generated, determining that an existing role of the electrical device has been updated to the new role, wherein communication patterns associated with the new role of the electrical device are different from communication patterns associated with the existing role of the electrical device.

24. The system of claim 18, wherein configuring the security policy in the network device to incorporate the generated rule comprises adding a permit information entry to a rules database in the network device for all allowed communication patterns for the electrical device.

25. The system of claim 24, wherein the rules database includes an access control list (ACL) and wherein adding the permit information entry to the rules database comprises adding a permit ACL entry that is operable to allow message exchanges between the electrical device and other devices that satisfy the allowed communication patterns associated with the electrical device.

26. The non-transitory computer-readable storage medium of claim 20, wherein the new role of the electrical device is selected from the group consisting of a current transformer, a voltage transformer, a circuit breaker, an isolator and an insulation monitor.

27. The non-transitory computer-readable storage medium of claim 21, wherein the electrical device is operable to perform one of a plurality of roles in the electrical substation, and wherein the one or more instructions are operable to cause the processor to perform operations comprising:

based on examining the configuration file for the electrical substation in response to determining that the update to the existing configuration file for the electrical substation has been generated, determining that an existing role of the electrical device has been updated to the new role, wherein communication patterns associated with the new role of the electrical device are different from communication patterns associated with the existing role of the electrical device.

28. The non-transitory computer-readable storage medium of claim 20, wherein configuring the security policy in the network device to incorporate the generated rule comprises adding a permit information entry to a rules database in the network device for all allowed communication patterns for the electrical device.

29. The non-transitory computer-readable storage medium of claim 28, wherein the rules database includes an access control list (ACL) and wherein adding the permit information entry to the rules database comprises adding a permit ACL entry that is operable to allow message exchanges between the electrical device and other devices that satisfy the allowed communication patterns associated with the electrical device.

* * * * *